April 17, 1928.
H. T. SEELEY
1,666,471
SYSTEM OF ELECTRIC DISTRIBUTION
Original Filed Feb. 17, 1926
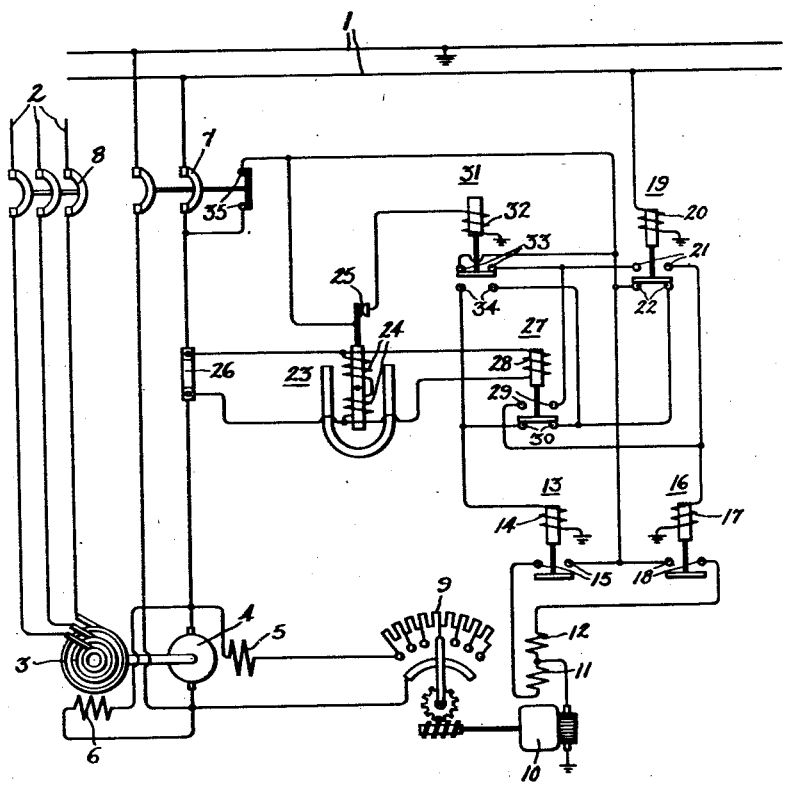
Inventor:
Harold T. Seeley,
by Alexander F. Lutz
His Attorney.

Patented Apr. 17, 1928.

1,666,471

UNITED STATES PATENT OFFICE.

HAROLD T. SEELEY, OF SCHENECTADY, NEW YORK, ASSIGNOR TO GENERAL ELECTRIC COMPANY, A CORPORATION OF NEW YORK.

SYSTEM OF ELECTRIC DISTRIBUTION.

Application filed February 17, 1926, Serial No. 88,904. Renewed August 31, 1927.

My invention relates to electrical distribution systems, particularly systems comprising a supply circuit and a load circuit interconnected by electrical apparatus and has for its principal object to provide an improved arrangement for controlling the operation of the inter-connecting units upon the occurrence of a reversal of energy flow therethrough.

The invention is especially adapted for use in connection with a system of distribution which comprises an alternating current supply circuit and a direct current load circuit interconnected by automatically operated synchronous-motor-generator substations. In a system of this type a direct current reversal of energy flow may be experienced as a result of low voltage in a direct current generator of the system, which results in an energy flow through the generator to the alternating current supply circuit. It is desirable to bring the generator voltage up to the system voltage in order to terminate the reversal of energy flow, but it is also desirable to prevent raising the generator voltage above a predetermined system voltage in order to prevent a reversal of energy flow in some adjacent substation. In accordance with my invention a reversal of energy flow is terminated and a condition of high system voltage is prevented by an improved regulating means operating in response to a reversal of energy flow to increase the direct current generator voltage only when its voltage is below a predetermined system voltage.

My invention will be better understood from the following description taken in connection with the accompanying drawing in which the single figure is a diagrammatic representation of one embodiment of the invention, and its scope will be pointed out in the appended claims.

Referring to the drawing, a direct current distribution system, designated herein as a direct current load circuit, is indicated by conductors 1 and is inter-connected with a supply circuit 2, shown as a three-phase alternating current line, by means of substations comprising rotary transforming means and control equipment. The load circuit 1 and supply circuit 2, may be interconnected by a suitable number of substations; illustration of more than one being omitted from the drawing for the sake of simplicity and clearness. In the arrangement as illustrated, the rotary transforming means is shown as a motor-generator set comprising a synchronous motor 3, mechanically connected to and here shown as mounted on the same shaft with, a direct current generator 4. Generator 4, is provided with a field winding 5 and is arranged to be connected to the load circuit 1 by any suitable means such as a circuit breaker 7. A synchronous motor 3 is provided with a field winding 6 and is arranged to be connected to the supply circuit 2 by any suitable means such as a circuit breaker 8. Circuit breakers 7 and 8 may be controlled by automatic switching means examples of which are well known in the art but since they do not constitute a part of my invention, I deem it unnecessary to show such means in detail. The field winding 6 of synchronous motor 3 is arranged to be energized from the direct current generator 4 although any other convenient source of direct current may be provided. Generator 4 is shown as self-excited and the voltage thereof is controlled by means of an automatically operated rheostat 9 in the field circuit 5. Rheostat 9 is shown as being operated by means of a pilot-motor 10 which is provided with reversely connected field windings 11 and 12.

The various circuits in the arrrangement shown in the drawing are controlled by relays and auxiliary switches discussed in some detail in the following description. For simplicity of illustration the load circuit is shown with one side permanently connected to ground, and hence a circuit for an operating coil of a relay is completed from the ungrounded side of the system through the coil to the ground; but it will be apparent that the invention is not limited to such a system.

A voltage raising relay 13 comprising a coil 14 and contacts 15 is associated with rheostat 9 and arranged when energized to complete a circuit for motor 10 and its field winding 11, so that motor 10 operates in a direction to cut out the resistance in the field circuit of generator 4. A voltage lowering relay 16 comprising a coil 17 and contacts 18 is also associated with rheostat 9 and arranged when energized to complete a circuit for motor 10 and field winding 12, so that the motor operates in a direction to insert resistance in the field circuit of generator 4. A voltage regulating relay 19 comprising a coil 20 and contacts 21 and 22 is energized from the load circuit 1 and is arranged to control the energization of relays 13 and 16. The connection of the voltage regulating relay 19 is made at such a point in the load circuit as will make it possible to maintain the voltage constant at the load center, which may be at the station bus or at a predetermined point of some particular feeder.

A power directional relay 23 comprising an operating coil 24 and contacts 25 is arranged to be energized from a shunt 26 in series with the generator leads to the load circuit 1. A direct current load regulating relay 27 comprising an operating coil 28 and contacts 29 and 30 is also energized from shunt 26. When the current delivered by the generator is above a predetermined value, relay 27 is arranged to close its contacts 29 in the circuit of voltage lowering relay 16 which then lowers the generator voltage to check the overload condition. Below the overload condition relay 27 is arranged to close its contacts 30 in the normal energizing circuit of voltage raising relay 13. The power directional relay 23 is instrumental in controlling the energization of relay 31, which comprises a coil 32 and contacts 33 and 34. Upon a reversal of energy flow contacts 25 of relay 23 are arranged to open and deenergize relay 31 which, when deenergized, permits control of voltage raising relay 13 so long as the generator voltage is below a predetermined system voltage, and prevents energization of the voltage lowering relay 16, so long as the power directional relay contacts 25 are open. Auxiliary contacts 35 are associated with circuit breaker 7 and are arranged to be open when the circuit breaker is open so as to prevent any automatic voltage control when the direct current generator is disconnected from the load circuit.

The operation of the embodiment of my invention as shown is as follows: The synchronous motor 3 is connected to the alternating current line 2 by closing circuit breaker 8 and is started and pulls into synchronism in a manner well-known. The direct current generator 4, directly connected to the synchronous motor 3, comes up to speed and is connected to the direct current load circuit 1 by means of circuit breaker 7 when its voltage is equal to or slightly higher than the load circuit voltage. When circuit breaker 7 is closed, auxiliary contacts 35 associated therewith close and connect the control circuit for all the relays except relay 19 to the ungrounded side of the generator supply bus.

If the voltage of the load circuit is below a predetermined value, voltage regulating relay 19 closes its lower contacts 22 and completes a circuit for the operating coil 14 of relay 13 from the ungrounded side of the direct current circuit, through contacts 35, contacts 22, contacts 30, coil 14, to the ground. When relay 13 is energized, its contacts 15 are closed and a circuit for pilot-motor 10 is completed from the ungrounded side of the direct current circuit through contacts 35, contacts 15, field winding 11, the pilot motor armature, to the ground. Under the influence of field winding 11, motor 10 is arranged to rotate in a direction to decrease the resistance 9 in the field circuit 5 of generator 4 and thereby increase the generator voltage. Should the load circuit voltage be too high, relay 19 closes its upper contacts 21 and completes a circuit to energize relay 16, at the same time deenergizing relay 13 and interrupting the circuit through field winding 11. A circuit is now established from the ungrounded side of the load circuit through contacts 35, contacts 33 of relay 31, contacts 21, coil 17, to the ground. When relay 16 is energized, its contacts 18 are closed and a circuit is completed from the ungrounded side of the direct current circuit, through contacts 35, contacts 18, field winding 12, the pilot-motor armature, to the ground. Under the influence of field winding 12, motor 10 is arranged to rotate in a direction to increase the resistance 9 in the shunt field circuit of generator 4 and thereby decrease the generator voltage. This automatic voltage regulation is carried out in accordance with predetermined conditions and normal running conditions are now obtained.

In case of a reversal of energy flow, which may be caused by a generator voltage lower than the load circuit voltage, it becomes desirable to bring the motor-generator operation back to normal by raising the generator voltage until the normal value or a predetermined value is attained. Upon a reversal of energy flow the contacts 25 of relay 23 are opened and the circuit for operating coil 32 of relay 31 is interrupted. Upon the deenergization of relay 31 its contacts 33 are opened and thereby introduce a break in the circuit for voltage lowering relay 16 so as to prevent any voltage lowering during the reversal of energy flow. At the same time that contacts 33 are opened, contacts 34 are closed to complete a break in a circuit for voltage raising relay 13. In the event that the system voltage is below a predetermined value contacts 22 of relay 19 are closed and a circuit is completed for voltage raising relay 13 so long as the reversal of energy flow continues. This circuit through contacts 35, contacts 22, contacts 34, coil 14 of relay 13, to the ground, will be completed in any event whether the direct current overload relay has opened its contacts 30 or closed its contacts 29. But it will be observed that when relay 31 is deenergized by the opening of contacts 25, neither the operation of overload relay 27 nor voltage regulating relay 19 will be effective to close a circuit for voltage lowering relay 16, since contacts 33 of relay 31 will remain open to introduce a break in either circuit for operating coil 17 of relay 16. It will also be observed that the voltage raising is only possible on the reversal of energy flow so long as the load circuit voltage is below a predetermined value and the voltage regulating relay 19 closes its lower contacts 22 for the low voltage condition.

If the generator voltage has been raised to the system voltage the reversal of energy flow will be terminated, power directional relay 23 will close its contacts 25, and the set will again be controlled by the normal operation of the voltage regulating relay 19 as explained hereinbefore.
While I have shown and described a particular embodiment of my invention, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:—

1. In a system of distribution, an electric circuit, a source of current connected to said circuit, means normally arranged to maintain constant an electrical condition of said circuit, and means controlled by a reversal of energy flow through said source cooperating with said first mentioned means for effecting a change in an electrical condition of said source when the electrical condition of said circuit is below a predetermined value and for preventing a change in the electrical condition of said source when the electrical condition of said circuit is above a predetermined value.
2. In a system of distribution, an electric circuit, a source of current connected to said circuit, means normally arranged to maintain constant the voltage of said circuit, and means controlled by a reversal of energy flow through said source cooperating with said first mentioned means for raising the voltage of said source when the voltage of said circuit is below a predetermined value and for preventing a change in the voltage of said source when the voltage of said circuit is above a predetermined value.

3. In a system of distribution, an electric circuit, a generator for supplying current to said circuit, a relay arranged when energized to effect an increase in the excitation of said generator, a second relay arranged when energized to effect a decrease in the excitation of said generator, control means responsive to the voltage of said circuit normally arranged to control the energization of said relays, and means controlled by a reversal of current through said generator cooperating with said control means for effecting the energization of said first mentioned relay when the voltage of said circuit is below a predetermined value and for preventing the energization of said relays when the voltage of said circuit is above a predetermined value.

4. In combination, a supply circuit, a distribution circuit, transforming means interconnecting said circuits, means for controlling said transforming means to control the interchange of power between said circuits, means responsive to the voltage of said distribution circuit normally arranged for controlling said transforming means to maintain the voltage of said distribution circuit substantially constant when the flow of power is from the supply circuit to the distribution circuit, and means controlled by the direction of power flow between said circuits cooperating with said voltage responsive means to render the same inoperative to control said tranforming controlling means when the distribution circuit voltage is above a predetermined value but arranged to permit said voltage responsive means to operate to raise the voltage on the distribution circuit when the distribution circuit voltage is below a predetermined value.

5. In a system of distribution, an electric circuit, a source of current connected to said circuit, means normally arranged to maintain constant the voltage of said circuit, means responsive to the magnitude of the current flow through said source for controlling the voltage of said source, and means controlled by a reversal of current through said source for permitting said first mentioned means to effect an increase in the voltage of said source irrespectively of the operation of said second mentioned means when the voltage of said circuit is below a predetermined value.

6. In a system of distribution, an electric circuit, a generator connected to said circuit and normally arranged to supply current thereto, a relay arranged to effect an increase in the excitation of said generator, another relay arranged to effect a decrease in the excitation of said generator, a control device normally arranged for controlling the operation of said first and second mentioned relays to maintain constant the voltage of said circuit, an electroresponsive device responsive to the magnitude of the current delivered by said generator cooperating with said control device for controlling the operation of said relays, and a directional relay cooperating with said control device for effecting the operation of said first mentioned relay irrespectively of the operation of said electroresponsive device upon a reversal of current through said generator when the voltage of said circuit is below a predetermined value.

7. In a system of distribution, an electric circuit, a generator normally arranged to supply current to said circuit, a relay arranged when energized to effect an increase in the excitation of said generator, a second relay arranged when energized to effect a decrease in the excitation of said generator, a control device responsive to the voltage of said electric circuit normally arranged for effecting the energization of said relays to maintain constant the voltage of said circuit, an electroresponsive device normally cooperating with said control device for limiting the current flow through said generator, a second electroresponsive device cooperating with said control device for controlling the energization of said relays, and a power directional relay operative in response to a reversal of current through said generator for controlling the operation of said second mentioned electroresponsive device to effect the energization of said first mentioned relay irrespectively of the operation of said first mentioned electroresponsive device and to remove said second relay from the control of said control device when the voltage of said circuit is below a predetermined value.

In witness whereof, I have hereunto set my hand this 16th day of February, 1926.

HAROLD T. SEELEY.